United States Patent [19]
Newsham et al.

[11] Patent Number: 5,615,134
[45] Date of Patent: Mar. 25, 1997

[54] METHOD AND SYSTEM FOR POLLING AND DATA COLLECTION

[75] Inventors: Guy R. Newsham; Dale K. Tiller, both of Ottawa, Canada

[73] Assignee: National Research Council of Canada, Ottawa, Canada

[21] Appl. No.: 394,741

[22] Filed: Feb. 27, 1995

[51] Int. Cl.⁶ .............................. G09B 7/06; G09B 7/07
[52] U.S. Cl. ........................ 364/550; 434/322; 395/603
[58] Field of Search .................................... 434/118, 322, 434/362, 350; 364/419.19, 419.2, 940.9, 940.6, 941.1, 941.2, 941.5, 941.7, 221.9, 221.1, 920.3, 550, 948.11, 927.631; 395/156, 160

[56] References Cited

U.S. PATENT DOCUMENTS 5,496,175  3/1996  Oyama et al. ......................... 434/118

FOREIGN PATENT DOCUMENTS

2-259889  10/1990  Japan .

Primary Examiner—Ellis B. Ramirez
Assistant Examiner—Tony M. Cole
Attorney, Agent, or Firm—Neil Teitelbaum & Associates

[57] ABSTRACT

A system is provided for collecting subjective data from a user of a computer or computer terminals. A user performing a task on his or her computer or terminal is polled, by: interrupting the task being performed; a banner appears on the screen of the display terminal with the selectable option of continuing with the interruption or returning immediately to the interrupted task. If a user selects to continue with the interruption, one or more questions, having selectable responses is presented to the user. After responding to the questions, the responses are stored on disk, and the user returns to the task that was interrupted. In real-time or after a period of days, weeks or months, the data is collected from the hard disk or system memory and is analyzed. The analyzed data is then used to control a process. In one example, the questions asked relate to a user's thermal comfort, and the data collected and analyzed is used to control a heating and cooling system.

4 Claims, 7 Drawing Sheets

METHOD AND SYSTEM FOR POLLING AND DATA COLLECTION

FIELD OF THE INVENTION

This invention relates to a system for collecting data from a user of a computer terminal, and more specifically relates to a polling system.

BACKGROUND OF THE INVENTION

If occupants of a commercial building could, at intervals, conveniently provide subjective input regarding their level of comfort, then lighting, temperature, ventilation and other variables could be automatically adjusted so that the majority of occupants were substantially satisfied. Traditional methods of polling such as paper-based subjective questionnaires can be handed out or mailed to occupants, but this is perceived to be a relatively large distraction and disturbance. Furthermore, priming, circulating and processing questionnaires is time consuming and costly. At times, subjects do not cooperate by filling in questionnaires, and furthermore, it may be essential when gathering some types of information to have the data collected from employees at particular times of day. For example, a company may want to determine the thermal comfort level of its employees; a questionnaire may ask if they comfortable, too warm, or too cold. In some situations an employee's comfort may change throughout the work-day and, from location to location within a building; thermal comfort may vary with external conditions, such the position of the sun at various times of the day. In this instance, it would be advantageous to obtain feedback from employees at particular times during the day and over a period of several days, weeks, or months. After obtaining useful feedback, an employer can attempt to make modifications to the building or to its heating or air-conditioning system in accordance with the collected data. Of course, it would be difficult to administer this kind of repetitive questioning using a paper-based questionnaire and it would likely be very disruptive. Therefore, it is one object of this invention, to provide a convenient method for collecting data, analyzing the collected data and, for making an environmental change or a change to a process in dependence upon the collected data.

In the past, some awkward attempts have been made to obtain subjective responses from building occupants in a more convenient way than using a paper-questionnaire. For example, in a paper entitled The Thermal Environment in Offices, David S. Fishman and Stephen L. Pimbert in Energy and Buildings, 5 (1982) 109–116, describe a study where the reactions of 26 subjects were recorded in a commercial building throughout the day for one year. At hourly intervals a central control system was arranged to initiate a two minute voting period during which time the subjects were requested to register a vote corresponding to one of seven positions on a seven point "Bedford" scale which relates to thermal comfort. The votes were stored in a special-purpose, built, control cabinet logic rack. To ensure that as many subjects as possible voted at a required time, a warning lamp and buzzer were activated at the commencement of the voting period. The lamp remained on for the two minute voting period or until the subject had voted. Although useful data was collected, the system employed for taking and recording subject's responses was costly, inflexible, and limited. Seven toggle switches provided by the specialized voting hardware offered only a limited choice in the responses that could be provided. If the subjects were not present during the time the warning lamp and buzzer were activated, they could miss the opportunity to vote. Furthermore, the lamp and buzzer were potential annoyances to others close by but not participating in the study. Another limitation was that the single question the subjects were to answer had to be known in advance by the subjects. To obtain additional data on clothing, subjects were provided with weekly paper-based questionnaires that were filled in by each subject and from which the thermal insulation of their clothing was estimated. Of course, having more detailed data would have been advantageous but was not practicable given the limitations of the equipment employed in this study.

A variety of other systems are known, which poll at intervals, however these systems are limited to polling hardware to obtain data rather than polling humans to obtain subjective responses to particular questions which have an impact on controlling a process. For example, U.S. Pat. No. 5,315,53 1, issued May 24, 1994 and assigned to Westinghouse Electric is entitled "Energy Monitoring System for a Plurality of Local Stations With Snapshot Polling From a Central Station" and relates to a personal computer (PC) for monitoring the energy, power, voltage, and current consumed at a plurality of local stations; A command from the PC causes at each station, the power, voltage, current and totaled energy to be stored, and thereafter the PC computer derives individually the results for separate estimations and central billing. In another U.S. Pat. No. 5,194,846 issued in 1993 an invention entitled "Communication System Capable of Broadcast Messaging and Transponder Polling", a communication system controller is coupled over a communication path with two or more transponders. Periodic polls of all transponders in sequence provide supervision of the integrity of the system.

Numerous other systems exist which poll or take samples at intervals from a plurality of device sensors, and although these systems may adequately control devices in response to polling, there remains a need for a system which is capable of polling the users of computer systems from time to time, to determine their subjective responses to particular questions so that the results can be compiled into useful control data.

SUMMARY OF THE INVENTION

In accordance with the invention, there is provided, a method of generating control data comprising the steps of:

a) polling a plurality of times, a user engaged with a task being performed on a computer having, an input device, a memory device for storing data, a processing unit, and a display terminal, said polling step including:

i) interrupting the task being performed on the computer;

ii) querying the user for one or more responses to questions, by displaying one or more questions and a plurality of selectable responses on the display terminal;

iii) storing the responses to the one or more questions in the memory device; and, returning the computer to a state prior to step (i) so that the user may resume the task that was being performed prior to said interruption; and, b) analyzing/processing the users' responses to obtain control data for use in effecting the control of a process that is unrelated to the computer system or its operation.

In accordance with the invention, there is provided, in a system having a plurality of computers each having an input device, a memory device for storing data, a processing unit, and a display terminal, a method of generating control data comprising the steps of:

polling a plurality of users engaged with tasks being performed on the computers by i) interrupting the plurality of users' tasks being performing on the computers;

ii) querying the users for one or more responses, by displaying one or more questions on the display terminals;

storing the responses to the one or more questions in the memory devices; and, returning the computers to a state prior to step (i) so that the users may resume the tasks that were being performed; and, analyzing/processing the users' responses to obtain control data for use in effecting the control of a process that is unrelated to the computer system or its operation.

In accordance with the invention, there is provided, a method of controlling a controllable device comprising the steps of:

a) querying a plurality of users of computers positioned at display terminals, each display terminal having an input device, by interrupting the each user's current task on the computer, and posing one or more questions on each user's display terminal so that each user may input via the input device one or more responses to the one or more questions being posed;

b) storing the input responses in a memory;

c) retrieving the stored responses from the memory;

d) analyzing the stored responses to generate a control signal that is derived from the information contained in the stored responses; and, e) providing the control signal to the controllable device.

In accordance with another aspect of the invention, there is provided, a system for controlling a process comprising:

a computer, having an input device, storage means for periodically storing data, a processing unit, a display terminal;

means for polling a user of the computer including means for interrupting the task being performed on the computer and means for querying a user for one or more responses, said querying means for displaying one or more questions on the display terminal at at least one of, a plurality of intervals, a plurality of predetermined times or at a plurality of random times; and, means for performing analysis of the stored responses in accordance with a set of rules; and, means for generating control data from the analyzed stored responses for use in controlling the process.

Advantageously, the invention provides a flexible method of collecting data; the data can be stored for collection periodically, or the data can be collected, stored and analyzed in nearly real-time. The system provides a convenient way for computer users to effect change and control over processes external to their computers while working at their PC's or terminals on other tasks.

BRIEF DESCRIPTION OF THE DRAWINGS

Exemplary embodiments of the invention will be described in conjunction with the drawings, in which.

DETAILED DESCRIPTION

Figure 1A:
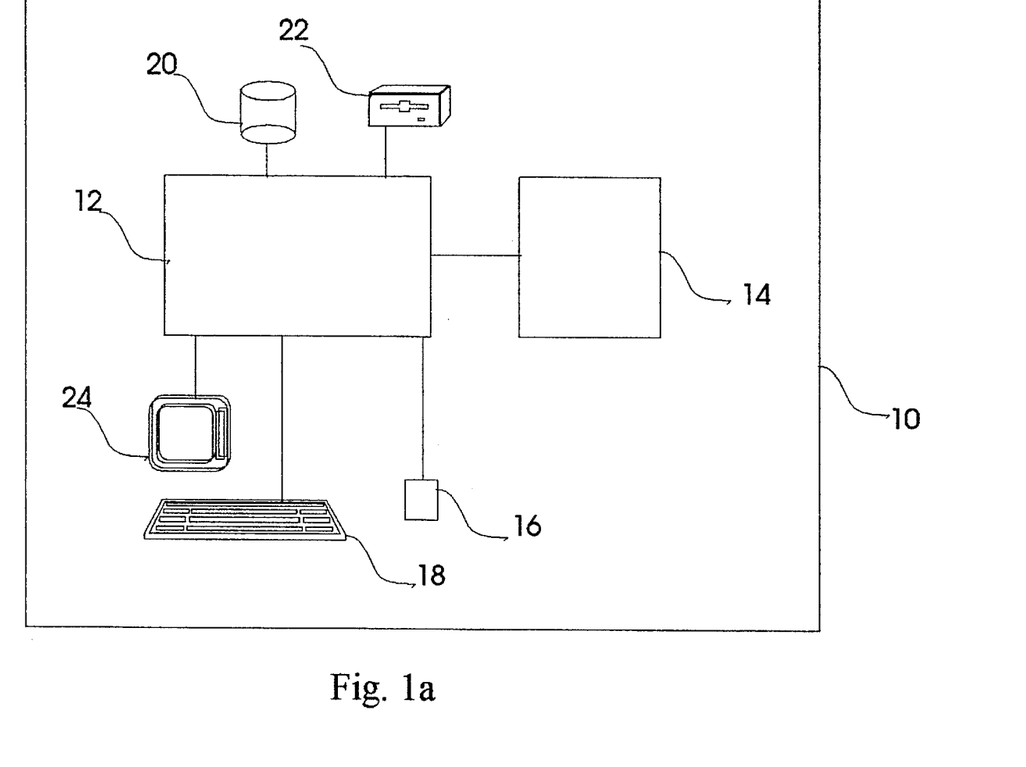
FIG. 1a is a block diagram of a stand-alone, suitably-programmed, personal computer.
Figure 2:
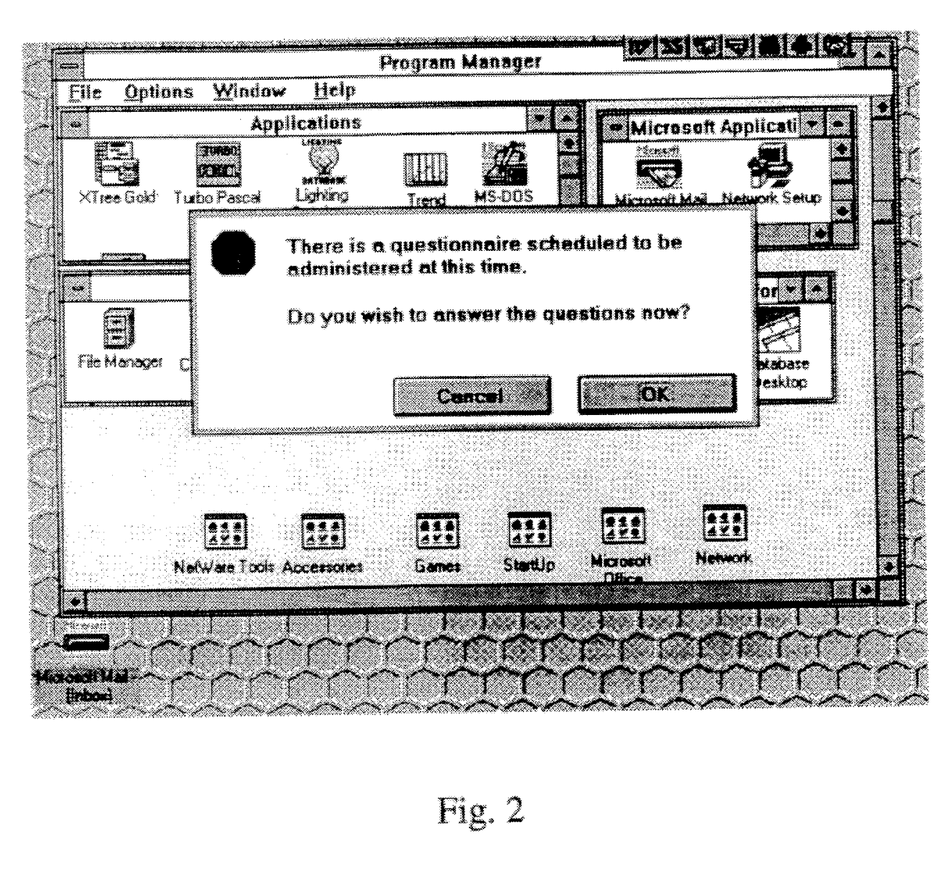
FIG. 2 is a view of the computer display showing a warning banner.

Referring now to FIG. 1a, a suitably programmed personal computer (PC) system 10 is shown having a central processing unit (CPU) 12, a memory unit 14, a pointing input device 16 in the form of a mouse, a keyboard 18, a hard disk drive 20, a floppy disk drive 22, and display terminal 24. In this exemplary embodiment the computer 10 is programmed so that at intervals during the day, once in the morning and once in the afternoon, but at times which vary from day to day, questions will appear on the screen of the display terminal, interrupting and polling a user for subjective responses to particular questions. In the preferred embodiment of this invention, the questions are preceded with a warning banner indicating to the user that an interruption is occurring, as is shown in FIG. 2. The warning banner provides the user with the opportunity to answer the questions immediately or to cancel the current query. If the user is busy and clicks on the Cancel button, the questions are rescheduled to appear at a later, predetermined, time. At that later, predetermined time, the warning banner appears again. If the Cancel button is once again selected, the questions does not re-appear until the next scheduled question administration time. If a user is not present when the warning banner appears and there is no response after a predetermined period, the warning banner is removed and the question appears again later. Various alternative schemes can be employed, such as continually polling a user at regular and/or more frequent intervals if there is no response.

Figure 3:
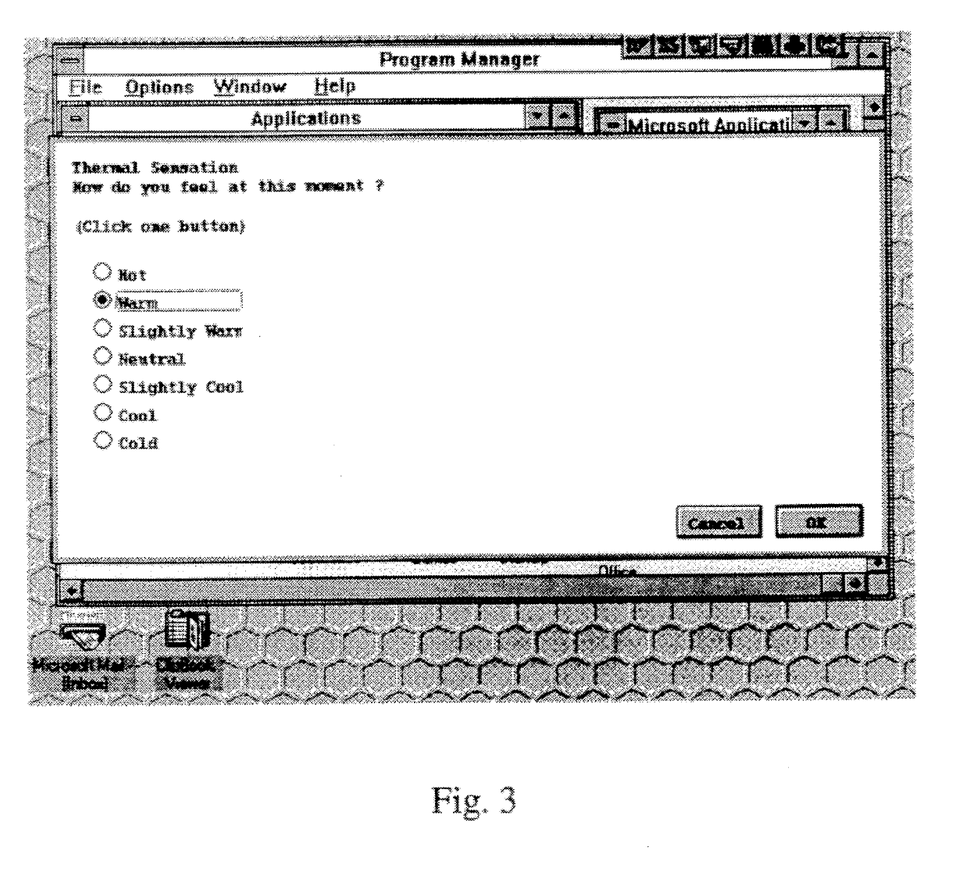
FIG. 3 is view of the computer display showing a question related to thermal comfort asked to a computer user.

In the instance that a user selects the OK button, indicating to the software that the user agrees and is ready to be queried, a question appears on the screen; by way of example a question that might be asked is shown in FIG. 3. The user is prompted for a response and after an answer is selected with the mouse 16 or the keyboard 18 subsequent questions appear. When all questions have been answered, the responses are recorded in the PC's hard disk drive 20 for later retrieval. By posing the same question to a group of computer users at approximately the same time, subjective responses to that question are recorded and can be analyzed. For example, in a general case, if a majority of a group of users who respond to the question shown in FIG. 3 select the same response, changes can be made to the heating/cooling system in accordance with that response; however, the responses can be analyzed by a plurality of different rules. For example, the system's monitored physical data such as those received from thermostats and temperature sensors, may be weighted or combined in some manner with subjective responses/data collected from a group of polled computer users. Probabilistic or fuzzy logic may also be combined with the users' responses in the analysis/processing of the collected data.

Figure 1B:
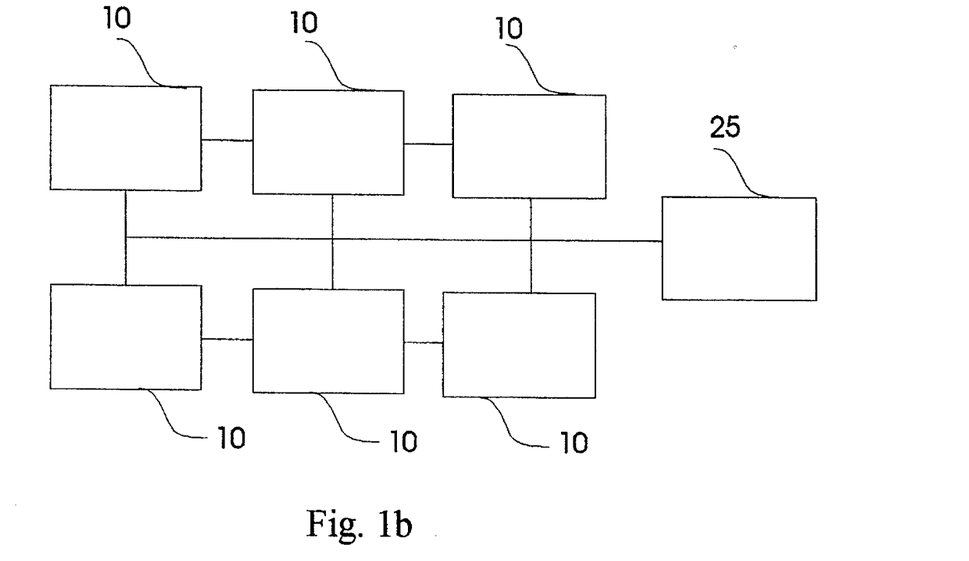
FIG. 1b is a block diagram of a network of computers connected to a central controller.

In a system according to one embodiment of this invention shown in FIG. 1b, where computers 10 are interconnected on a network, and wherein PC users' responses are available to a central controller 25, real-time adjustments can be made to control building temperature, for example, on the basis of a plurality of users responses; in the case where a majority of PC users indicate on the screen (FIG. 3) that they are cold, the building temperature can be raised according to the rule that the majority of users will have their needs met. Conversely if the majority of PC users are too warm, the building temperature can be lowered by the central controller 25.

Figure 4:
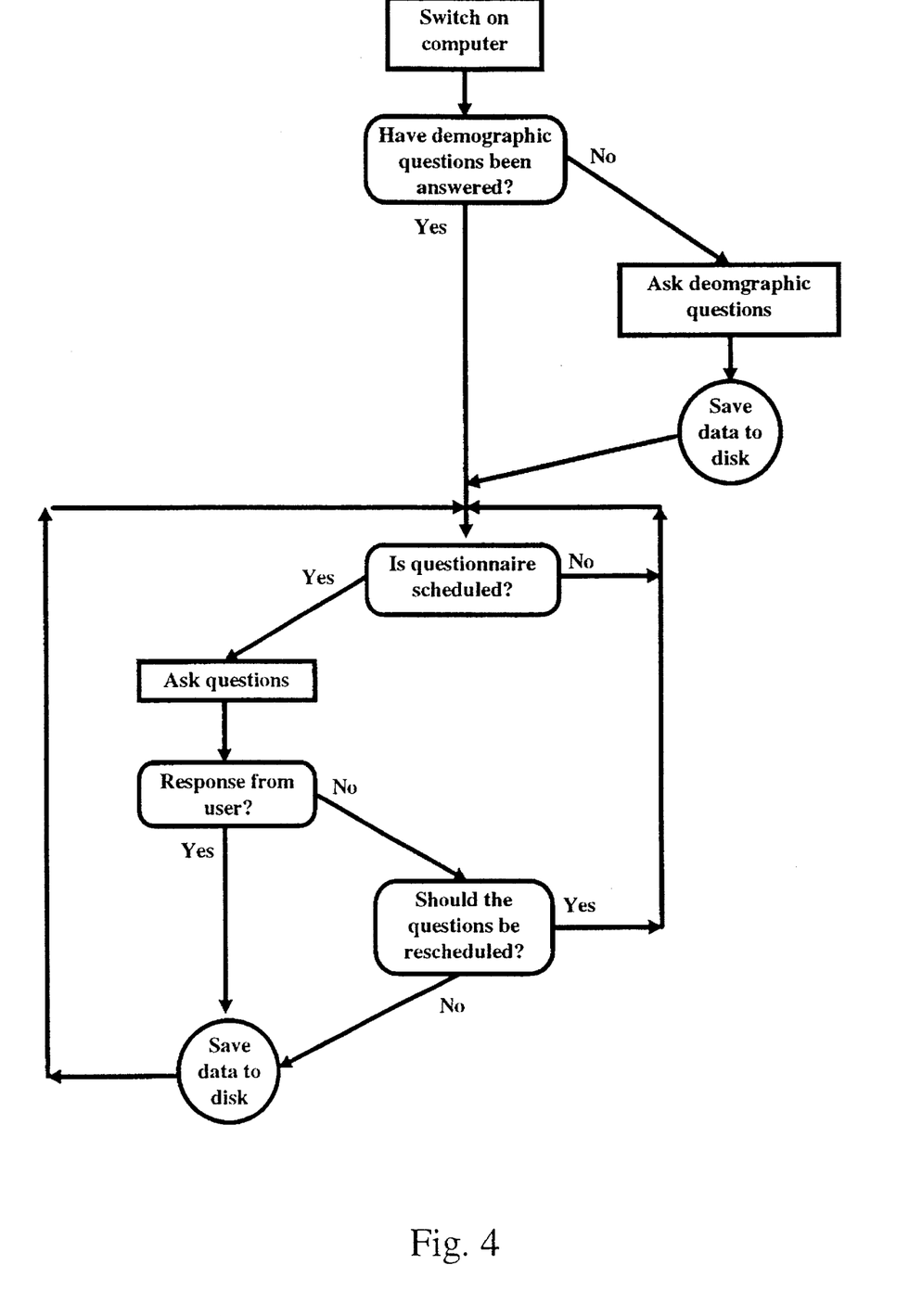
FIG. 4 is a flowchart showing the system operation related to one embodiment of this invention.

In a preferred embodiment, the PC's are stand-alone units as is shown in FIG. 1a, not interconnected to one another; the data is conveniently stored in a hidden and encrypted format on each host computer's hard disk 20 for later collection and analysis. Windows™, Macintosh™ and DOS™ versions of the system have been developed to suit the particular operating systems or graphical user interface in use. The operation of the system, according to this embodiment, is readily understood by referring to the flow diagram of FIG. 4. A user switches on the PC and is asked certain demographic questions that are only asked once. These demographic questions may comprise queries relating to age, sex, and education of the subject. Other questions relating to the physical location and orientation of the computer terminal may optionally be asked. The responses to these questions are then recorded on the system's hard disk 20. As can be seen from viewing the flow diagram, when a questionnaire is scheduled, a banner appears asking the user if he or she wishes to respond to questions. If the answer is no, the questions may be rescheduled. Otherwise, the questions appear on the display terminal 24 and the selected responses are saved to disk.

Experimental Results

Figure 5:
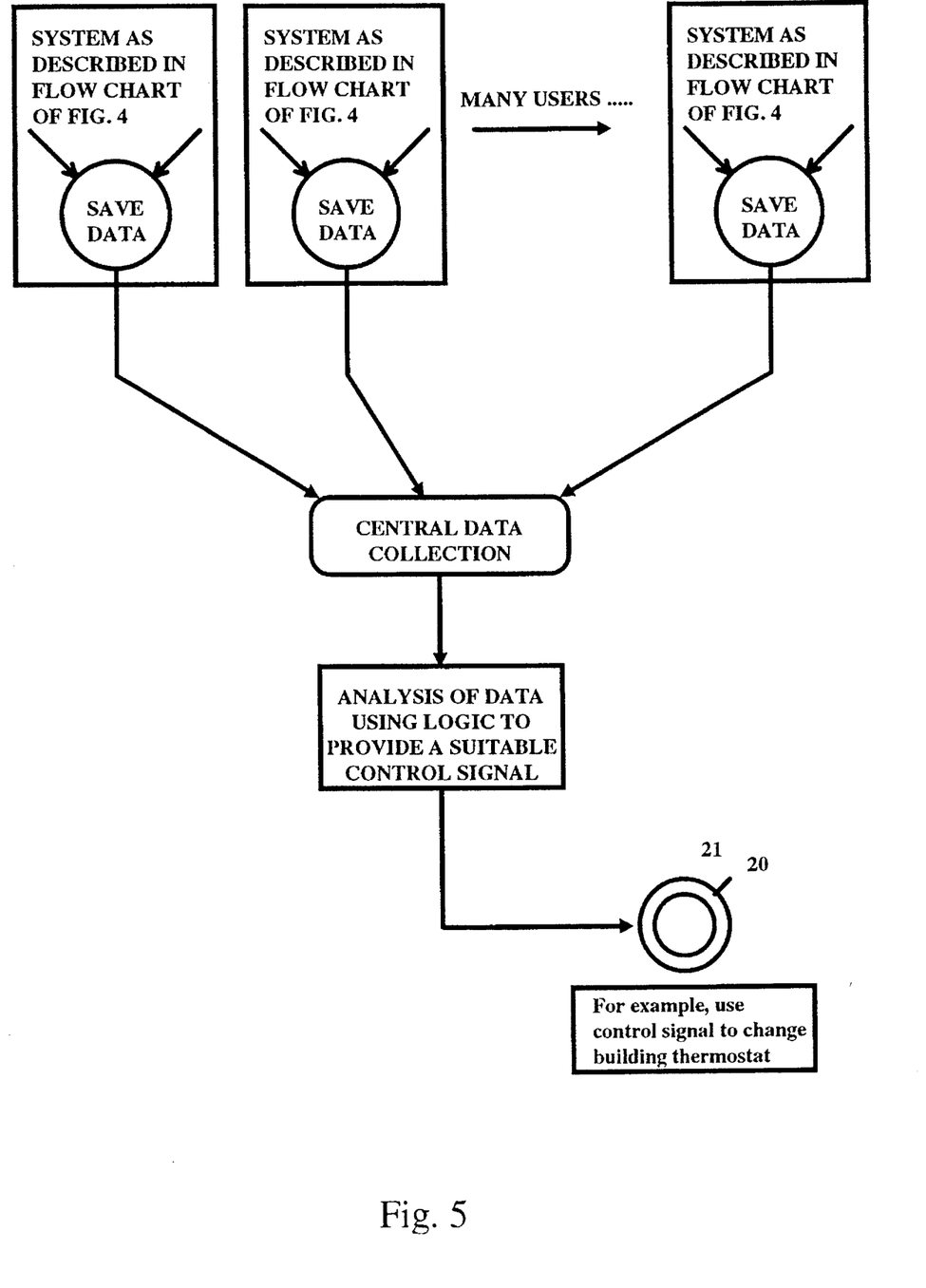
FIG. 5 is a flowchart showing the system operation related to another embodiment of this invention.

The software that relates to this invention was installed on over 60 stand-alone computers at four sites. Five questions relating to thermal comfort were asked twice per day for up to 16 weeks. Preliminary results from 55 participants indicate that software performed reliably. The five questions took an average of 45.3 seconds (standard deviation of 32.6) to complete. FIG. 5 shows the mean response rate of 29.1% over all of the 55 participants. The response rate of 29.1% represents over 1500 data points. All participants answered each question at least twice. In a post-study evaluation, it was revealed that this method of questionnaire delivery was not unacceptably intrusive to any participant.

Figure 6:
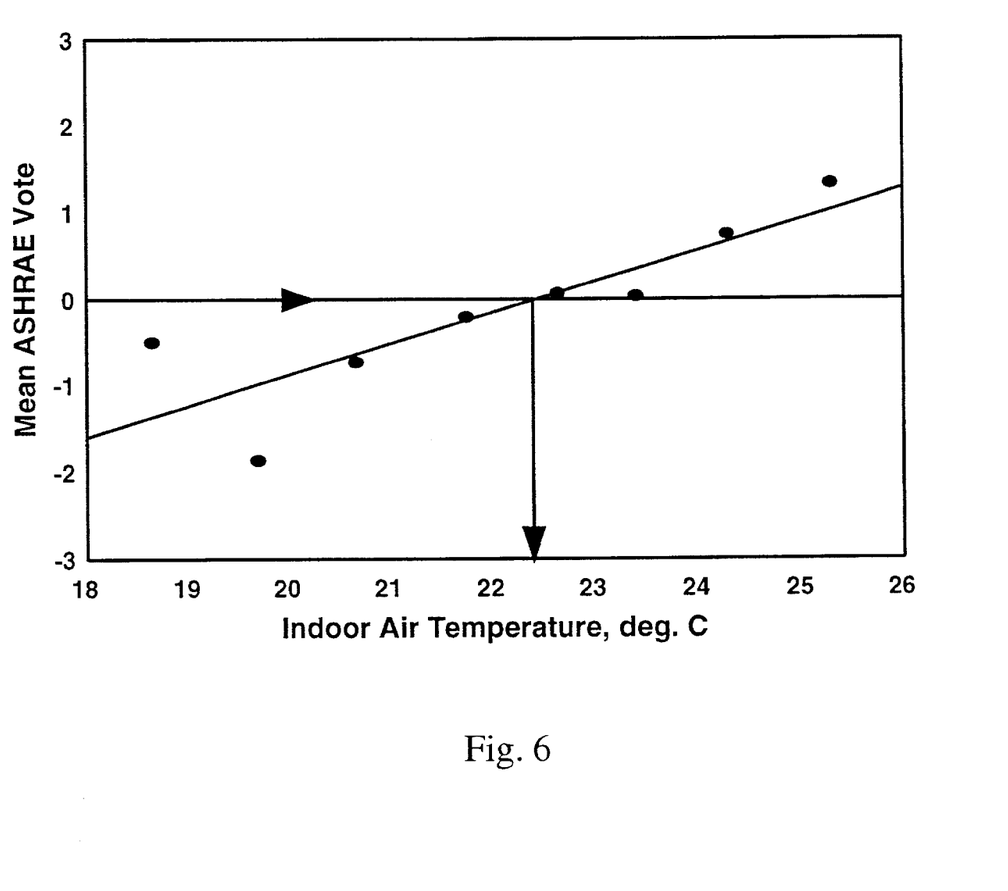
FIG. 6 is a graph of thermal sensation versus temperature derived from experimental data collected in accordance with a method of this invention.

Referring now to the graph of FIG. 6, the thermal sensation vote versus recorded temperature is shown. The data were analyzed at the end of the data collection period. Each point represents an average of up to 500 separate votes. The vertical bars intersecting the points on the graph represent the standard deviation in the thermal votes. The subjects were asked "how do you feel at this moment?" The choices ranged from −3 (cold) through 0 (neutral) to +3 (hot). Assuming that neutral is the most desirable thermal sensation, from the results of the graph, the best temperature to maintain is 22.7° C. Therefore, a building control system could be set to 22.7° C. in accordance with this result.

Figure 7:
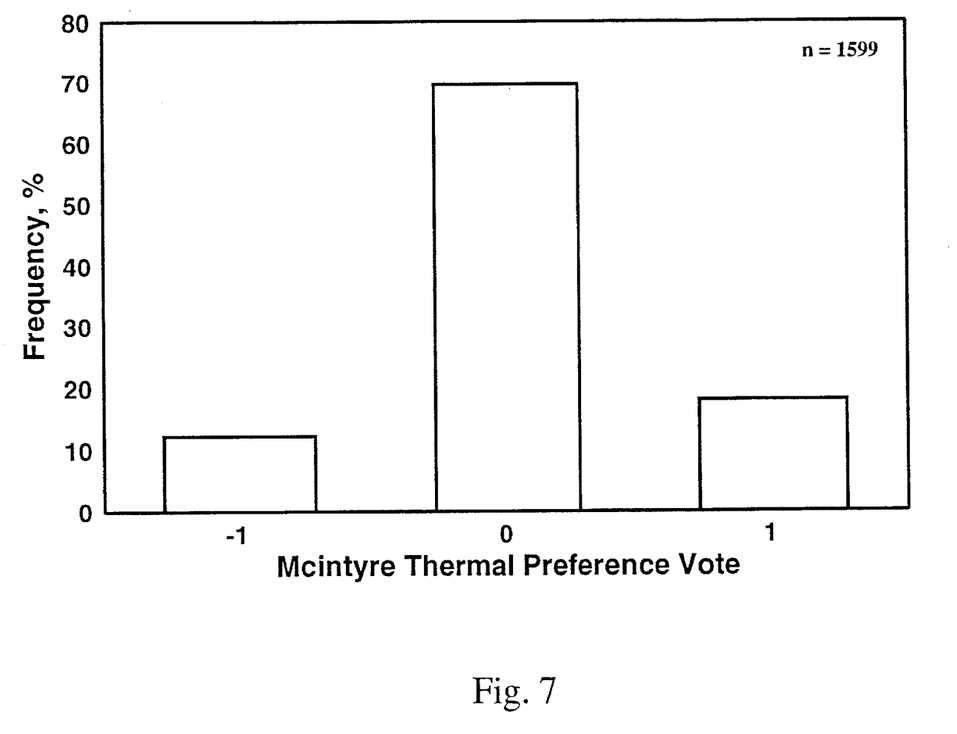
FIG. 7 is a frequency bar chart of thermal preference vote derived from experimental data collected in accordance with a method of this invention.

Turning now to FIG. 7, the question that appeared on the display terminal during the 3 month period was, "would you prefer to be cooler, warmer, or not have the temperature changed?" The results show high satisfaction with the temperature, however, there is indication of a slight preference on behalf of the participants to it being warmer.

If the computers were interconnected as is shown in FIG. 1b, the responses could be collected in real-time or nearly real-time, and analyzed upon collection in a manner similar to the analysis shown in FIGS. 6 and 7.

By having a control system that is dynamic and sensitive to the needs of the occupants of a building, a greater level of comfort can be provided. However, this invention is not intended to be limited to controlling only processes related to comfort. Polling computer users as is described and set out in accordance with this invention, offers an inexpensive and relatively unobtrusive method of acquiring subjective control data for use in controlling a process.

Other, perhaps less obvious processes can also be controlled in a similar manner. By way of example, staff in company cafeteria may require some indication as to how many employees will purchasing lunch at work, and/or may want to determine employees' preferences in food on a particular day given a list of choices. Again, by polling users of interconnected computers, the responses can be immediately electronically sent to a central location for analysis. After analysis of the data, the staff can better plan ahead so that the preferred menu choices are available in sufficient quantity.

In summary, the invention provides a flexible, efficient way to control a process so that the control is dependent upon the subjective data collected, by conveniently polling the people it will effect.

Numerous other embodiments may be envisaged without departing from the spirit and scope of the invention.

What we claim is:

1. A method of generating control data comprising the steps of:
   a) polling a plurality of times, a user engaged with task being performed on a computer having an input device, a memory device for storing data, a processing unit, and a display terminal, said polling step including:
      i) interrupting the task being performed on the computer:
      ii) querying the user for one or more responses to questions that relate to the user's thermal sensation, by displaying one or more questions and a plurality of selectable responses on the display terminal:
      iii) storing the responses to the one or more questions in the memory device; and, returning the computer to a state prior to step (i) so that the user may resume the task that was being performed prior to said interruption: and,
   b) analyzing/processing the users' responses to obtain control data used to control a heating and/or cooling system to enhance the user's thermal comfort, the control data therefore being for use in circling the control of a process that is unrelated to the computer system or its operation.

2. The method as defined in claim 1, wherein the one or more questions relate to the user's comfort and wherein the control data that is analyzed is used to control a system relating to an environmental parameter selected from the group of lighting, ventilation, temperature and white noise.

3. In a system having a plurality of computers each having an input device, a memory device for storing data, a processing unit, and a display terminal, a method of generating control data comprising the steps of:
   polling a plurality of users engaged with tasks being performed on the computers by
      i) interrupting the plurality of users' tasks being performing on the computers;

ii) querying the users for one or more responses, by displaying one or more questions on the display terminals;

storing the responses to the one or more questions in the memory devices; and, returning the computers to a state prior to step (i) so that the users may resume the tasks that were being performed; and, analyzing/processing the users' responses to obtain control data for use in effecting the control of a process that is unrelated to the computer system or its operation, wherein the result of the analysis of the users' responses will effect a decision in the planning of an event.

4. A system for controlling a process comprising:

a computer, having an input device, storage means for periodically storing data, a processing unit, a display terminal;

means for polling a user of the computer including means for interrupting the task being performed on the computer and means for queering a user for one or more responses, said querying means for displaying one or more questions on the display terminal at at least one of, a plurality of intervals, a plurality at predetermined times or at a plurality of random times; and, means for performing analysis of the stored responses in accordance with a set of rules:

means for generating control data from the analyzed stored responses for use in controlling the process;

means for converting the control data into one or more control signals; and, a control device for controlling one of temperature, lighting, ventilation, and white noise, said control device being responsive to the one or more control signals.

* * * * *